Aug. 22, 1967
C. PERARDI
3,336,628
ANIMAL SKINNER
Filed June 30, 1965
2 Sheets-Sheet 1
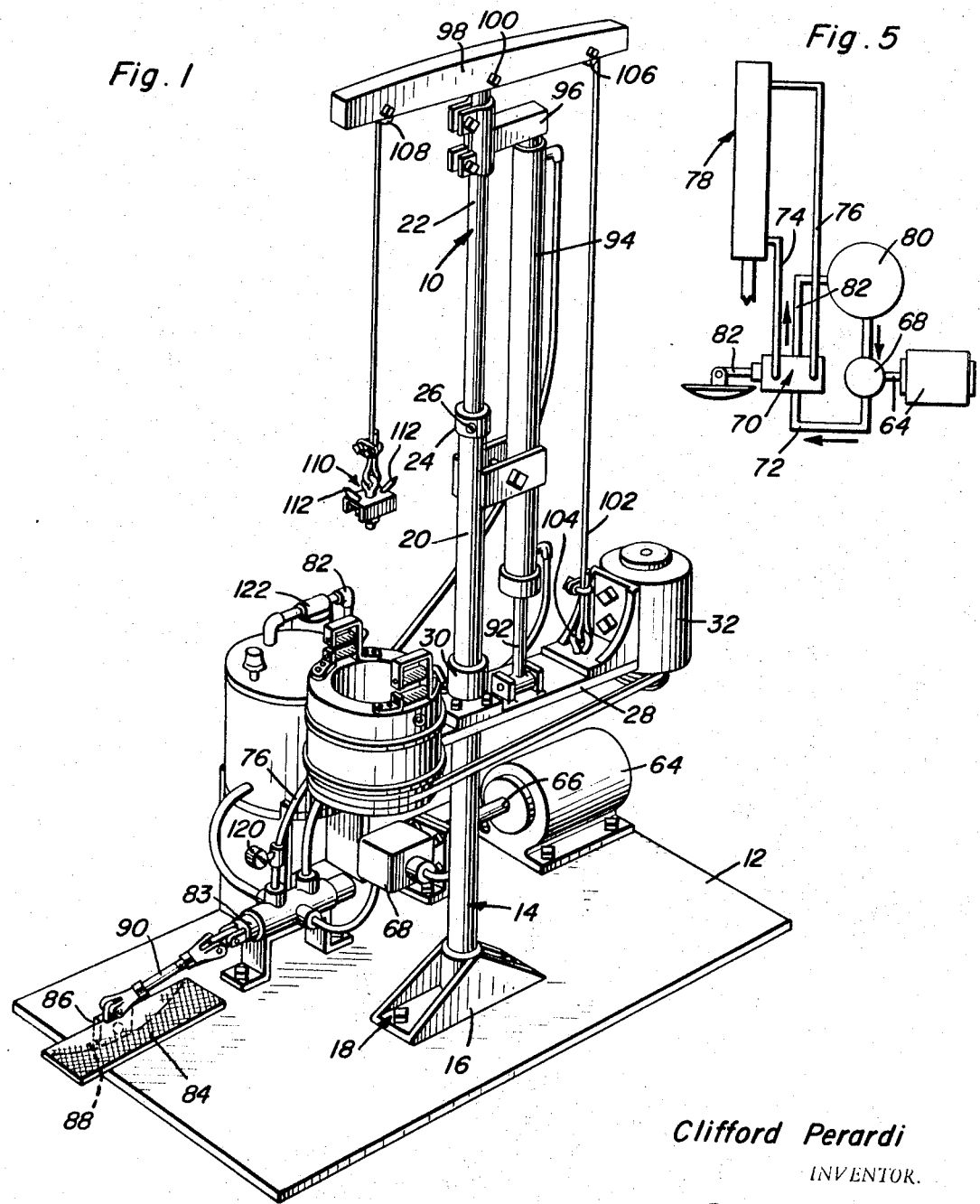
Clifford Perardi
INVENTOR.
BY Clarence A. O'Brien
and Harvey B. Jacobson
Attorneys Aug. 22, 1967 C. PERARDI 3,336,628
ANIMAL SKINNER
Filed June 30, 1965 2 Sheets-Sheet 2
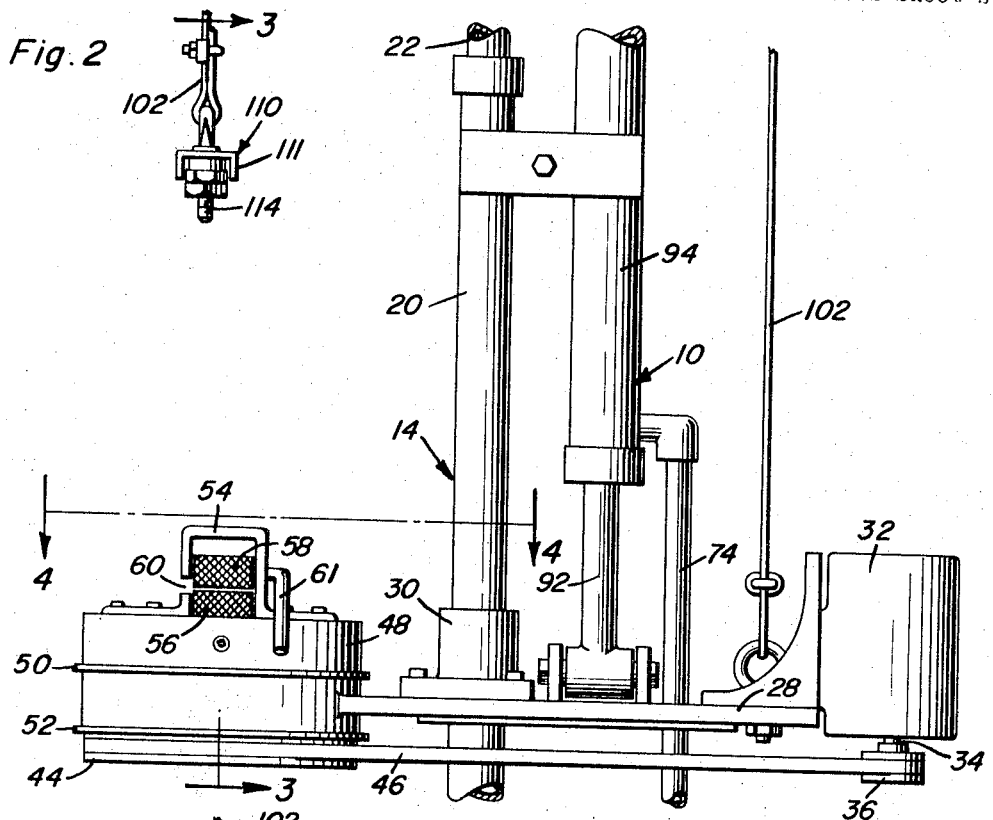
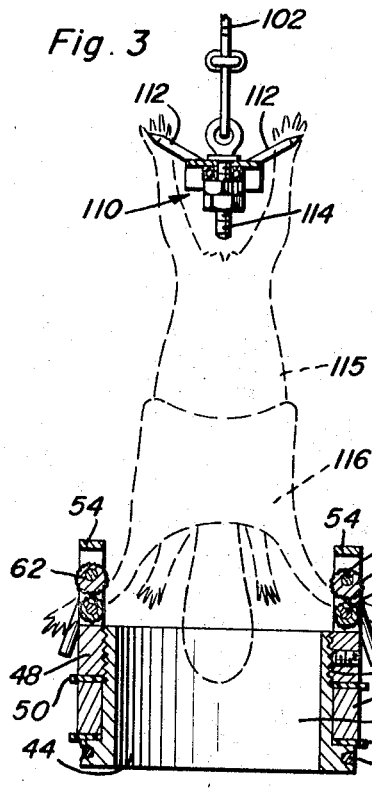
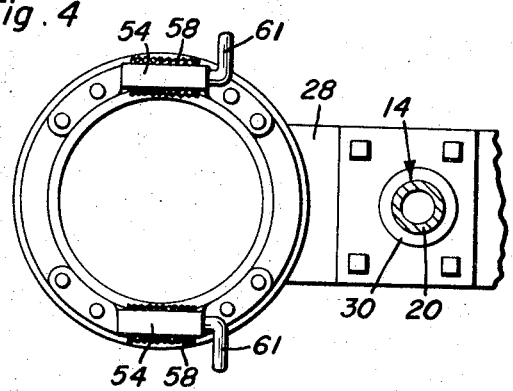
Clifford Perardi
INVENTOR.
BY Clarence A. O'Brien
and Harvey B. Jacobson
Attorneys

3,336,628
ANIMAL SKINNER
Clifford Perardi, R.F.D. 1, Farmington, Ill. 61531
Filed June 30, 1965, Ser. No. 468,284
8 Claims. (Cl. 17—21)

This invention relates to a novel and useful animal skinner and more specifically to an apparatus designed to greatly facilitate a person skinning an animal by supporting the animal to be skinned in an advantageous position and slowly rotating the animal and the skin being drawn therefrom in a manner such that a person may stand or be seated in one location and make all of the necessary cuts to loosen the skin from a carcass being skinned.

There are many types of animal skinners presently on the market but none appears to be designed primarily to assist a person in skinning a carcass by supporting the carcass to be skinned and rotating the carcass as well as the skin being stripped or drawn therefrom in a manner such that the skinner may make all of the necessary cuts to assist the skin in being drawn from the carcass while standing or being seated in a stationary position. Accordingly, it is the main object of this invention to provide an animal skinner which will greatly add to the comfort of a person skinning a carcass and which will support the carcass to be skinned in a manner such that the necessary cuts to assist in the removal of the skin from the carcass may be more readily made.

A further object of this invention is to provide an animal skinner capable of supporting the carcass to be skinned at variable elevations and with means being provided for elevating the carcass to be skinned in a manner such that elevation of the carcass may be accomplished slowly and gradually.

Yet another object of this invention is to provide an animal skinner in accordance with the preceding objects and constructed in a compact manner and of relatively lightweight materials in order that the skinner may be readily stored and/or transported from one location to another.

A final object of this invention to be specifically enumerated herein is to be provide an animal skinner in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the animal skinner of the instant invention;

FIGURE 2 is a fragmentary side elevational view of a portion of the animal skinner intermediate its upper and lower ends;

FIGURE 3 is a fragmentary vertical sectional view taken substantially upon the plane indicated by the section line 3—3 of FIGURE 2;

FIGURE 4 is a fragmentary horizontal sectional view taken substantially upon the plane indicated by the section line 4—4 of FIGURE 2; and FIGURE 5 is a diagrammatical view of the hydraulic system of the animal skinner utilized to raise and lower the carcass to be skinned.

Referring now more specifically to the drawings, the animal skinner is generally designated by the reference numeral 10 and may be seen to include a mounting base 12. An elongated longitudinally extendible upright generally referred to by the reference numeral 14 is secured at its lower end to the base 12 by means of a suitable foot construction 16 secured to the upright and also to the base 12 by means of suitable fasteners 18.

The upright 14 includes a lower large diameter tubular section 20 and an upper small diameter section 22. The upper end of the lower section 20 is provided with a collar 24 including a setscrew 26 releasably engageable with the upper section 22 in order to retain the latter in adjusted extended positions.

A support plate 28 is supported from the lower section 20 by means of a mounting collar 30 slidably secured to the upright 14 and one end of the support plate 28 has an electric motor 32 mounted thereon provided with an output shaft 34 on which a pulley wheel 36 is mounted. The remote end of the support plate 28 disposed on the opposite side of the upright 14 includes a large diameter and horizontally disposed annular terminal end portion 38. A tubular sleeve 40 including a diametrically reduced and externally threaded upper end portion 42 is journalled in the terminal end portion 38 and includes a lower end portion 44 which projects below the terminal end portion 38 and defines a pulley alined with the pulley 36, an elongated flexible belt 46 drivingly connecting the pulley 36 to the lower end of the sleeve 40.

The externally threaded upper end portion 42 of the sleeve 40 has the lower internally threaded end portion of an upper sleeve 48 threadedly engaged therewith and an anti-friction washer or annulus 50 is disposed between the lower end of the upper sleeve 48 and the upper surface of the annular terminal end portion 38. In addition, an anti-friction washer or annulus 52 is disposed between the lower surface of the terminal end portion 38 and the diametrically enlarged lower end portion 44 of the sleeve 40. Accordingly, it may be seen that the sleeve 40 and the upper sleeve 48 supported therefrom are rotatably journalled from the terminal end portion 38.

A pair of suitable mounting brackets 54 are secured to diametric opposite portions of the upper end of the upper sleeve 48 in any convenient manner and journal pairs of rollers 56 and 58 therefrom and also define throat openings 60 in alinement with corresponding sets of ends of the rollers 56 and 58. The rollers 56 are mounted for rotation about concentric axes and the rollers 58 are eccentrically mounted and have lever arms 61 provided on corresponding end portions of the supporting axle shafts 62 therefor journalled from the brackets 54. Accordingly, it may be seen that the rollers 58 may be rotated so as to be moved into and out of contacting relation with the corresponding rollers 56.

The base 12 also supports a second electric motor 64 including an output shaft 66 which is drivingly connected to a hydraulic pump 68 also supported from the base 12.

The hydraulic pump 68 has its discharge outlet communicated with the inlet of a valve assembly generally referred to by the reference numeral 70 by means of a conduit 72 and the valve assembly includes a pair of outlet conduits 74 and 76 communicated with opposite ends of a double acting hydraulic cylinder generally referred to by the reference numeral 78. In addition, the valve 70 also includes an outlet communicated with a hydraulic reservoir 80 by means of a conduit 82. The valve 70 includes a reciprocal actuating shaft 83 which projects into one end of the valve 70 and the other end of the shaft 83 is operatively connected to a rockable foot control 84 pivotally supported from the base 12 by means of a mounting flange 86 supported from the base 12 to which the rockable foot control 84 is pivoted by means of a pivot fastener 88. The foot control 84 is operatively connected to the shaft 83 by means of a longitudinally extendible link 90 and it is to be understood that the valve 70 is spring-loaded so as to return the rockable foot control 84 to a neutral position when the foot control 84 is released. Pivoting action of the foot control 84 will communicate the pump 68 with the conduit 74 and the conduit 76 with the conduit 82. In addition, pivotal movement of the foot control 84 in the opposite direction will communicate the conduit 72 with the conduit 76 and the conduit 74 with the conduit 82. Therefore, it may be seen that by rocking the foot control 84 back and forth the double acting hydraulic cylinder 78 may be extended and retracted.

The double acting hydraulic cylinder 78 has the free end of its piston rod 92 secured to the support plate 28 and the remote end of the cylinder portion 94 of the double acting cylinder 78 is secured to a clamp assembly 96 adjustably secured to the upper section 22 of the upright 14. In addition, a crosshead or walking beam 98 is pivotally secured to the upper end of the upper section 22 by means of a suitable pivot fastener 100 and one end of a flexible tension member 102 is secured to the support plate 28 as at 104, the free end of the tension member 102 passing over a pair of pulleys 106 and 108 journalled from opposite ends of the walking beam 98 and being provided with an animal carcass-supporting assembly 110 on its free end portion depending downwardly from the pulley 108.

The carcass-supporting assembly 110 comprises an inverted channel-member 111 to which a pair of upwardly and oppositely inclined spikes 112 are secured in any convenient manner. An eye member 114 secured to the free terminal end portion of the tension member 102 is secured through and rotatable relative to the inverted channel member 111 and accordingly, it may be seen that an animal carcass may be readily rotatably supported from the carcass-supporting assembly 110.

With attention now invited to FIGURE 3 of the drawings it may be seen that a carcass illustrated in phantom lines and designated by the reference numeral 115 is supported from the carcass-supporting assembly 110 and that portions of the skin 116 of the carcass 115 are secured releasably between the rollers 56 and 58 of each pair of rollers supported from the upper sleeve 48.

In operation, as the upper sleeve 48 is rotated by means of the electric motor 32, the torque applied to the skin 116 is transmitted to the carcass 115 and thereafter to the carcass-supporting assembly 110 which is capable of rotating relative to the free end portion of the tension member 102. Then, as a person skinning the carcass 115 makes cuts between the skin and carcass as the latter is rotated, he may also actuate the rockable foot control 84 in order to raise the carcass supporting assembly 110 relative to the standard 14 as well as lower the collar 30 and the skin-engaging rollers 56 and 58 supported therefrom. This of course will cause the carcass 115 to be elevated relative to the skin-clamping rollers 56 and 58 and the skin 116 to be pulled downward from the carcass 115. Inasmuch as the carcass 115 and the skin 116 are being slowly rotated by means of the electric motor 32 and the elevation of the area of separation of the carcass 115 and the skin 116 remains substantially constant since the skin 116 is lowered and the carcass 115 is raised, a person skinning the carcass 115 may stand or be seated in one location and skin the carcass 115 with reasonable comfort.

Although it is to be understood that the details of construction of the instant invention may vary, certain features warrant attention herein as it has been found that they are highly useful. As best illustrated in FIGURE 1 of the drawings, a pressure gage 120 is communicated with the conduit 76 in order that the operating pressure of the hydraulic pump 68 may be observed. In addition, an oil filter 122 is provided in the conduit 82. Still further, other suitable controls and accessories may be utilized on the animal skinner 10 as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal skinner comprising main support means, an upright support at its lower end from said support means, animal skin-engaging means supported from and to one side of said upright, animal carcass-engaging means supported from said upright in vertically spaced relation relative to said skin-engaging means, said skin and carcass-engaging means being supported from said upright for inverse vertical movement relative to said main support means, and means operatively connected between said upright and said skin engaging means as well as said carcass-engaging means operative to vertically shift the latter two relative to said main support means.

2. The combination of claim 1 wherein said skin-engaging means is supported from said upright for rotation about an upright axis and said carcass-engaging means is supported from said upright for rotation about an axis substantially coinciding with the first mentioned axis.

3. The combination of claim 1 wherein said means connected between said upright and said skin engaging means as well as said carcass-engaging means includes a horizontally disposed elongated crosshead carried by and projecting outwardly from opposite sides of said upright and including opposite end guide means, an elongated flexible tension member extending between, supported from, shiftable longitudinally relative to and including opposite end portions depending downwardly from said guide means, one lower terminal end of said tension member operatively supporting said skin-engaging means and the other lower terminal end of said tension member operatively supporting said carcass-engaging means, and motor means connected between said upright and said animal skin-engaging means for vertically shifting the latter relative to said main support means.

4. The combination of claim 3 including a horizontal support member slidable on and projecting outwardly from opposite sides of said standard, said skin-engaging means being supported from one end of said horizontal support member and said one lower terminal end of said tension member being secured to the other end of said horizontal support member, said carcass-engaging means being spaced above said skin-engaging means.

5. The combination of claim 4 wherein said skin-engaging means is supported from said upright for rotation about an upright axis and said carcass-engaging means is supported from said upright for rotation about an axis substantially coinciding with the first mentioned axis.

6. The combination of claim 5 wherein said animal skin-engaging means includes an upstanding sleeve member concentrically disposed relative to and rotatable about the first mentioned axis and including skin-gripping assemblies spaced circumferentially thereabout adapted to releasably grip animal skin, the upper end of said sleeve member being adapted to receive the lower portion of an animal carcass telescoped downwardly thereinto.

7. The combination of claim 6 including motor means supported from the other end of said horizontal support member and drivingly connected to said sleeve member.

8. The combination of claim 3 wherein said motor means comprises a double acting hydraulic cylinder, pressurized fluid source means, and control means operatively connecting said fluid source means to said hydraulic cylinder and operable from a remote location for selectively extending and retracting said hydraulic cylinder.

References Cited

UNITED STATES PATENTS

| 3,024,491 | 3/1962 | Mills | 17—21 |
| 3,213,489 | 10/1965 | Walsh | 17—21 |

FOREIGN PATENTS

| 153,184 | 9/1963 | Russia. | |

LUCIE H. LAUDENSLAGER, *Primary Examiner.*